United States Patent [19]

Schwellinger

[11] Patent Number: 5,766,546
[45] Date of Patent: Jun. 16, 1998

[54] HIGH INTERNAL PRESSURE FORMING OF ALUMINUM ALLOY HOLLOW BODIES

[75] Inventor: Pius Schwellinger, Tengen, Germany

[73] Assignee: Alusuisse Technology & Management Ltd., Switzerland

[21] Appl. No.: 816,542

[22] Filed: Mar. 13, 1997

[30] Foreign Application Priority Data

Apr. 10, 1996 [EP] European Pat. Off. ............ 96810223

[51] Int. Cl.$^6$ .................................................. C22C 21/08
[52] U.S. Cl. .................. 420/544; 148/688; 148/695; 148/698; 148/699; 148/700; 148/415; 148/416; 148/417; 420/535; 420/544
[58] Field of Search ...................... 148/688, 695, 148/698, 699, 700, 415, 416, 417; 420/535, 544

[56] References Cited

U.S. PATENT DOCUMENTS 4,085,606 4/1978 Lugosi ............................. 72/60

FOREIGN PATENT DOCUMENTS 070790 7/1982 European Pat. Off. .......... C22F 1/04
70790 7/1982 European Pat. Off. .

*Primary Examiner*—David A. Simmons
*Assistant Examiner*—M. Alexandra Elve
*Attorney, Agent, or Firm*—Bachman & LaPointe, P.C.

[57] ABSTRACT

An alloy suitable for manufacturing components out of a hollow body by high internal pressure forming contains, in wt. %,

| | | |
|---|---|---|
| Silicon | | 0.3 to 1.6 |
| Magnesium | | 0.3 to 1.3 |
| Iron | max. | 0.5 |
| Copper | max. | 0.9 |
| Manganese | max. | 0.5 |
| Vanadium | | 0.05 to 0.3 |
| Cobalt | max. | 0.3 |
| Chromium | max. | 0.3 |
| Nickel | max. | 0.8 |
| Zirconium | max. | 0.3 | and other alloying elements, individually at most 0.05, in total at most 0.15, the remainder aluminum.

9 Claims, No Drawings

HIGH INTERNAL PRESSURE FORMING OF ALUMINUM ALLOY HOLLOW BODIES

BACKGROUND OF THE INVENTION

The invention relates to a component made of an alloy of the AlMgSi type, manufactured from a hollow body by high internal pressure forming.

Components having complex geometrical shape and varying cross-section, which cannot be made by conventional processes such as mechanical widening, can be manufactured by high internal pressure forming. In this process a hollow body is shaped in a mold by applying pressure to it from within. For example, the sealed ends are pressed into the mold, or a piston is slowly drawn outwards so that the material in contact with a solid surface is able to flow after it. Also known are processes which operate with hydrostatic counter-pressure. With complicated shapes it may also be necessary to perform some bending before the actual high pressure forming stage. The hollow body employed is in many cases a straight piece of pipe, however a pre-form in the form of a sheet may also be used. In the case of aluminum alloys extruded sections are also suitable as hollow body or pre-forms. These are employed e.g. in the form of pipe, section with contour suited to the final product or also in the form of a multi-chamber hollow section.

Apart from the many different processes which may be used to achieve a high degree of deformation, the material employed for this purpose is also very important. The forming characteristics determine essentially the maximum degree of forming that can be achieved; in that respect a high degree of elongation is an important indication for good formability. In the case of forming with high internal pressure the elongation in the transverse direction is also very important whereby, besides good formability, also the uniformity of properties is an important aspect. For example, in the case of an extruded section, the properties can differ from the start of the extruded length to its end, this because of the different degrees of forming during the extrusion process.

Also to be taken into consideration are the requirements made of the finished component. The construction may require e.g. a certain level of strength, certain minimum degree of elongation, corrosion resistance or other essential property values.

Among the aluminium alloys which are shaped into components today using high internal pressure forming are in particular the standard AlMgSi type of alloys. Although alloys of this type, compared with other alloys systems, offer good elongation and formability characteristics for high internal pressure forming, further optimization of the properties is desirable.

SUMMARY OF THE INVENTION

In view of the above, the object of the present invention is to provide a suitable material with especially good formability along with good mechanical properties in the finished component.

That objective is achieved by way of the invention in that the hollow body employed for the manufacture of the component is of an alloy containing, in wt. %,

| | | |
|---|---|---|
| Silicon | | 0.3 to 1.6 |
| Magnesium | | 0.3 to 1.3 |
| Iron | max. | 0.5 |

-continued

| | | |
|---|---|---|
| Copper | max. | 0.9 |
| Manganese | max. | 0.5 |
| Vanadium | | 0.05 to 0.3 |
| Cobalt | max. | 0.3 |
| Chromium | max. | 0.3 |
| Nickel | max. | 0.8 |
| Zirconium | max. | 0.3 | and other alloying elements, individually at most 0.05 wt. %, in total at most 0.15 wt. %, the remainder aluminum.

The addition of vanadium to alloys of the AlMgSi type leads to a fine grained structure with excellent formability properties and good elongation values also in the transverse direction.

A preferred composition is such that the alloy features 0.08 to 0.13 wt. % vanadium, and in addition contains 0.05 to 0.15 wt. % manganese.

DETAILED DESCRIPTION OF PREFERRED EMBODIMENTS

The use of the alloy composition according to the invention for manufacturing components by high internal pressure forming leads to a favorable microstructure in the component. An important feature of the microstructure which improves the formability characteristics is the extremely small grain size. This is achieved with the alloy composition according to the invention, whereby also during intermediate annealing, which is unavoidable in some cases prior to further shape forming, the grain size coarsens only insignificantly.

Components can be manufactured by all the currently known methods of high internal pressure forming using hollow bodies made using the alloy according to the invention. These processes include in particular also variants in which additional material is fed from outside and/or in which at least one sliding means is pushed outwards. Additionally, the hollow body may be bent before or during the high internal pressure forming. Likewise it is possible to work with hydrostatic counter-pressure in order to achieve a higher degree of deformation. Before reaching the ultimate degree of deformation, the hollow body may be subjected to an intermediate anneal, without the grain size coarsening significantly in that process.

A preferred application for the component according to the invention is foreseen in automobile manufacture.

The advantages of the alloy according to the invention are revealed in the following comparison between an alloy having the composition according to the invention and another comparative alloy.

EXAMPLE

An alloy A having the composition according to the invention and an alloy B for comparison were extruded to flat sections under the same conditions.

| Alloy | Si | Fe | Cu | Mn | Mg | Cr | Zn | V | Zr |
|---|---|---|---|---|---|---|---|---|---|
| A | .74 | .20 | .21 | .08 | .78 | .005 | .005 | .10 | .001 |
| B | .71 | .22 | .19 | .08 | .77 | .005 | .007 | .004 | .16 |

The flat sections were made into tensile test pieces for testing in the direction transverse to the direction of extrusion. Tensile test pieces subjected to the same heat treatment were then tested in the direction transverse to the direction of extrusion; the following mechanical properties were measured.

| Alloy | Rp0.2 [Mpa] | Rm [Mpa] | Ag [%] | A5 [%] |
|---|---|---|---|---|
| A | 294 | 360 | 13.7 | 20.2 |
| B | 291 | 359 | 12.7 | 18.0 |

Where:
Rp0.2 = elastic limit
Rm = tensile strength
A5, Ag = elongational fracture Further investigations into the grain size showed that, after heat treatments such as an intermediate anneal, the alloy A according to the invention exhibits a much smaller degree of grain coarsening than alloy B.

I claim:

1. Process which comprises manufacturing a component from an alloy of the AlMgSi type, wherein the alloy consists essentially of, in wt. %

| | | | |
|---|---|---|---|
| Silicon | | 0.3 | to 1.6 |
| Magnesium | | 0.3 | to 1.3 |
| Iron | max. | 0.5 | |
| Copper | max. | 0.9 | |
| Manganese | max. | 0.5 | |
| Vanadium | | 0.05 | to 0.3 |
| Cobalt | max. | 0.3 | |
| Chromium | max. | 0.3 | |
| Nickel | max. | 0.8 | |
| Zirconium | max. | 0.3 | | and other alloying elements, individually at most 0.05, in total at most 0.15, the remainder aluminum, including the step of forming a hollow body made of said alloy by high internal pressure forming, wherein a hollow body is shaped in a mold by applying pressure to said body from within, and wherein said alloy has a fine grained structure with excellent formability properties and good elongation.

2. Process according to claim 1, wherein additional material is fed from outside.

3. Process according to claim 1, wherein at least one sliding means is pushed outwards.

4. Process according to claim 1, wherein the hollow body is bent before or during the high internal pressure forming.

5. Process according to claim 1, wherein a hydrostatic counterpressure is employed.

6. Process according to claim 1, wherein an intermediate anneal is carried out before an ultimate degree of deformation is reached, without significantly coarsening the grain size during the intermediate anneal.

7. Process according to claim 1, including the step of using said component in automobile manufacture.

8. Process according to claim 1, wherein vanadium is included in the alloy in an amount from 0.08 to 0.13 weight percent.

9. Process according to claim 1, wherein manganese is included in the alloy in an amount from 0.05 to 0.15 weight percent.

* * * * *